US011700504B2

(12) United States Patent
Mahmood et al.

(10) Patent No.: US 11,700,504 B2
(45) Date of Patent: Jul. 11, 2023

(54) METHOD AND SYSTEM FOR CALIBRATION OF AN INDOOR SPACE

(71) Applicants: Ahmed Mahmood, Milton (CA); Joshua Karon, Toronto (CA); Sean Huberman, Guelph (CA); Vera Miller, Toronto (CA); Eros Gulo, Woodbridge (CA); Naiyu Chen, Mississauga (CA)

(72) Inventors: Ahmed Mahmood, Milton (CA); Joshua Karon, Toronto (CA); Sean Huberman, Guelph (CA); Vera Miller, Toronto (CA); Eros Gulo, Woodbridge (CA); Naiyu Chen, Mississauga (CA)

(73) Assignee: MAPSTED CORP., Mississauga (CA)

( * ) Notice: Subject to any disclaimer, the term of this patent is extended or adjusted under 35 U.S.C. 154(b) by 0 days.

(21) Appl. No.: 17/590,635

(22) Filed: Feb. 1, 2022

(65) Prior Publication Data
US 2022/0210600 A1  Jun. 30, 2022

Related U.S. Application Data

(62) Division of application No. 17/134,226, filed on Dec. 25, 2020, now Pat. No. 11,356,801.

(51) Int. Cl.
*H04W 4/021* (2018.01)
*H04W 4/029* (2018.01)
*G01C 21/00* (2006.01)
*G01C 21/20* (2006.01)
*G01C 21/32* (2006.01)

(52) U.S. Cl.
CPC .......... *H04W 4/021* (2013.01); *G01C 21/206* (2013.01); *G01C 21/32* (2013.01); *G01C 21/3881* (2020.08); *H04W 4/029* (2018.02)

(58) Field of Classification Search
CPC .... G01C 21/3881; G01C 21/32; G01C 21/20; G01C 21/206; G01C 21/005;
(Continued)

(56) References Cited

U.S. PATENT DOCUMENTS

| 7,894,984 B2 * | 2/2011 | Rasmussen | G06T 17/05 |
| | | | 340/995.14 |
| 8,983,493 B2 * | 3/2015 | Brachet | H04W 4/021 |
| | | | 370/328 |

(Continued)

FOREIGN PATENT DOCUMENTS

| WO | WO-2009086278 A1 * | 7/2009 | ........... G01S 5/0236 |
| WO | WO-2014055278 A1 * | 4/2014 | ............. G01C 21/20 |

*Primary Examiner* — Matthew C Sams (57) ABSTRACT

A method and a device for performing targeted calibration are described. In an example, instructions to acquire spatial data in a predefined region in an indoor space is are received, the indoor space divided into a grid of a plurality of polygonal tiles in a size-wise hierarchy and tessellated at each level of the size-wise hierarchy, wherein the instructions comprise information regarding a group of polygonal tiles from amongst the plurality of polygonal tiles in the predefined region to gather the spatial data for, the group of polygonal tiles selected at a hierarchical level in the size-wise hierarchy, and wherein the spatial data is to be gathered for the group of polygonal tiles along a substantially continuous path connecting the group of polygonal tiles to be traversed for gathering the spatial data. In response to the instructions, acquisition of the spatial data along the substantially continuous path may be commenced. A feedback indicative of conformance, in real-time, to the substantially continuous path may be generated and the acquisition of the spatial data may be adjusted, based on the feedback.

19 Claims, 7 Drawing Sheets

(58) Field of Classification Search
CPC ............ G01C 21/3415; G01C 21/3492; G01C 21/3638; G01C 21/367; G01C 21/3826; G01C 21/3841; G01C 21/3867; G01C 21/3878; H04W 4/021; H04W 4/029; H04W 16/18; H04W 4/02; H04W 4/024; H04W 4/027; H04W 48/08; H04W 48/14; H04W 48/20; H04W 64/00; H04W 8/005; H04W 84/12; G01S 5/0236; G01S 5/0045; G01S 5/02522; G01S 5/0278; G01S 5/0295; G05D 1/0088; G05D 1/0221; G05D 1/0238; G05D 1/0246; G05D 1/0274; G05D 2201/0216; H04L 45/126

See application file for complete search history.

(56) References Cited

U.S. PATENT DOCUMENTS

| | | | |
|---|---|---|---|
| 9,081,079 B2* | 7/2015 | Chao | G01S 5/02522 |
| 9,441,978 B2* | 9/2016 | Ivanov | G01C 21/3867 |
| 10,948,918 B2* | 3/2021 | Dey | G01C 21/206 |
| 11,356,801 B1* | 6/2022 | Mahmood | H04W 4/021 |
| 2014/0005933 A1* | 1/2014 | Fong | G01C 21/20 |
| | | | 701/447 |
| 2015/0134850 A1* | 5/2015 | Rolf | G01C 21/3841 |
| | | | 709/241 |
| 2016/0271795 A1* | 9/2016 | Vicenti | B25J 9/163 |
| 2019/0265711 A1* | 8/2019 | Dey | G01C 21/3415 |
| 2021/0231440 A1* | 7/2021 | Jadhav | G01C 21/387 |
| 2022/0210599 A1* | 6/2022 | Mahmood | H04W 4/021 |
| 2022/0210600 A1* | 6/2022 | Mahmood | H04W 4/021 |

* cited by examiner

METHOD AND SYSTEM FOR CALIBRATION OF AN INDOOR SPACE

CROSS-REFERENCE TO RELATED APPLICATION

This application claims the benefit of priority to U.S. application Ser. No. 17/134,226 filed Dec. 25, 2020. Said U.S. application Ser. No. 17/134,226 is hereby incorporated in the entirety herein.

TECHNICAL FIELD

The disclosure herein relates to calibration of an indoor space for localization.

BACKGROUND

Location-based services are rapidly expanding as a ubiquitous service proposition. Outdoor location technologies are mainly based on GPS (Global Positioning System) technologies. At the same time, users of mobile devices have started to increasingly use and depend on indoor positioning and navigation applications and features. Particularly, indoor positioning and navigation of a mobile device carried or worn by a user can be difficult to achieve using satellite-based navigation systems, such as GPS, because the satellite-based navigation technology generally relies on the line-of-sight between the mobile device and the satellite. Accordingly, when the connection between the two becomes unavailable, or is only sporadically available, such as within enclosed, or partially enclosed, urban infrastructure and buildings, including hospitals, shopping malls, airports, university campuses and industrial warehouses, the positioning and navigational capability of the satellite-based navigation system becomes unreliable. In turn, indoor navigation and positioning solutions may rely on various sensors including accelerometers, gyroscopes, and magnetometers that may be commonly included in mobile phones and other computing devices, in conjunction with acquired wireless communication signal data to localize the mobile device. Thus, effectiveness of the indoor navigation and positioning solution is directly dependent on the quality of data, sensor or signal, and the manner of utilization of data for localization.

BRIEF DESCRIPTION OF THE DRAWINGS

FIG. 2.1 illustrates, as an example, the indoor space divided plan into a plurality of polygonal tiles.

FIG. 2.2 illustrates, as an example, the indoor space represented as a hierarchical grid.

DETAILED DESCRIPTION

Among other benefits and technical effects, embodiments provided herein provide for efficiently, effectively, and accurately providing indoor-location based services to mobile devices in an indoor space. According to an aspect, the present subject matter involves a tessellated, hierarchical grid in which its individual components are interlinked with each other at different hierarchical levels. The tessellation or tiled structure of the grid as well as the interlinked hierarchical structure allows for representing the indoor space in an effective and true manner, and at the same time, allows for indexing the spatial data associated with the indoor space in a manner that the information is easily and efficiently retrievable. As used in the present context, as an example only, the spatial data can be understood as the data which can identify the geolocation of a region or a physical entity in the indoor space, and the correlation of such geolocation with one or more tiles and one or more levels in the hierarchical grid.

Generally, large indoor spaces, such as shopping malls, airports, parking garages, and warehouses, that attract significant user traffic also seek to host a wide set of services that may be of interest to a user. Such services may often be specifically curated for a user based directly on a location of the mobile device of the user. For instance, an effective indoor location-based services (ILBS) system is able to generate suggestions of services and locations to the user by initiating a quick search in the vicinity of a user's location indicated by the user's mobile device. In few other instances, the ILBS systems may further allow a user to search for services or amenities and pin them as potential points-of-interest (POIs). At the same time, the ILBS systems may even offer efficient routing or navigation, coupled with user-friendly navigation, to reach a user-selected destination. Therefore, such indoor-location based services, given their application, form an obvious integration option for indoor positioning systems (IPSs) that seek to accurately localize or locate mobile devices in such indoor spaces. In other words, a natural application of IPSs lies in offering indoor location-based services.

In addition, recent technological advancements which allow the universally available smart mobile devices packing a variety of sensors for gathering data that is usable for positioning, has extended the reach of IPS as well as ILBS. Typically, the IPS uses spatial data generated by such mobile devices in the indoor location to execute efficient and effective localization. The spatial data can be linked to entities in a floor plan, and the entities are, in turn, georeferenced, thereby facilitating localization. In view of the enormous amount of spatial data that must be parsed by the IPS, the manner in which the spatial data is representative of the indoor space and the ease of access and use of the spatial data is of particular relevance to the IPSs. Both, the representation of the indoor space by the spatial data as well as the ease of access of the spatial data, may be governed by the technique of spatial indexing implemented by the IPS. In turn, therefore, the spatial indexing may have a direct bearing on the effectiveness and the efficiency of the IPS, which may be of particular relevance if the IPS is to offer time-sensitive services, such as navigation.

Conventionally, the indoor space is represented as a connected network of linearly positioned dots along walking paths that may be traversed and are indicative of the possible locations of the mobile device in the indoor space. In such a manner of representation of the indoor space by the corresponding spatial data and the indexing thereof, the localization capability may be limited and the localization may always be a tradeoff between efficiency/speed and accuracy. For instance, for an accurate measurement, a large region of the indoor space may have to be considered to increase the probability of locating the mobile device therein, which can involve considerably large amount of spatial data to be accessed and processed leading to a slow rate of localization and, therefore, ineffectiveness in providing the indoor location-based services.

In addition, the IPSs require some form of system calibration prior to going live upon deployment for localization. The most typical type of calibration for localization is fingerprinting. In order to ensure sufficiently high accuracy of an indoor positioning or navigation solution, many individual fingerprint measurements must be taken at many locations within an area during the fingerprint calibration and mapping process to create a fingerprint repository. Particularly, in order to build the fingerprint repository, reference data is collected at known locations using various data sources and data points, including Wi-Fi signal strength, Bluetooth Low Energy (BLE) signal strength, Global Positioning System (GPS) availability, and magnetic field strength measurement, or a combination thereof.

The data collection is, usually, done by sending a data collection device to specific locations in the indoor space to collect the reference data therefrom. Since each such measurement may typically take at least several minutes at each location or position, such fingerprint calibration and mapping process therefore constitutes a highly labor-and time-intensive, expensive limiting barrier to deployment and scalability of indoor navigation solutions. Additionally, for a calibrator operating the data collection device, the act of standing at each location and waiting for data collection to take place can be extremely boring and mentally taxing, not to mention inefficient and even ineffective in certain cases. At the same time, even with such a data collection and fingerprinting, the spatial resolution that may be achieved while mapping the indoor space may be insufficient in adequately representing the indoor space. Therefore, the localization done using such calibration and fingerprinting may provide inaccurate results.

Examples of the present subject matter are described herein which seek to address, inter alia, the above outlined deficiencies. The present subject matter discloses a manner by which optimal acquisition of spatial data and localization, for example, accurate as well as computationally light, is achieved which can facilitate rendering of efficient as well as accurate and effective indoor location-based services. According to an aspect, the present subject matter involves the use of a multi-layered, hierarchical grid made of polygons that cover the floor plan of the indoor space. The indoor space can be divided into a grid of polygonal tiles abutting adjacent polygonal tiles, i.e., having a tessellated structure. In addition, the polygonal tiles can also be provided in a hierarchical structure, such that a polygonal tile higher in the hierarchical structure substantially covers two or more smaller polygonal tiles lower in the hierarchical structure. The physical entities in the indoor space can be georeferenced and then cross-referenced with the polygonal tiles to correlate the georeference of each physical entity with the corresponding polygonal tile in each hierarchical level. The georeference may be any information which can be used to indicate the location of the physical entity. In one example, as part of georeferencing, global or absolute coordinates are used to indicate the location of the physical entities. In other examples, a local coordinate system, for instance, associated with the indoor space, may be used for georeferencing the physical entities. In addition, polygonal tiles at lower levels in the hierarchical structure, such polygonal tiles referred to as child tiles, can be hierarchically linked to one or more polygonal tile at a higher level in the hierarchical structure, such polygonal tiles referred to as parent tiles.

Such cross-referencing between the physical entities in the indoor space combined with the hierarchical relationship between the polygonal tiles is referred to as spatial indexing for the purposes of the present subject matter. In other words, the grid so created using the hierarchical grid of polygonal tiles and the georeferenced physical entities serves is spatially indexed for representing the indoor space. Once spatially indexed, the grid can be used for generating a grid map of the indoor space and can be used for, amongst other things, for acquiring spatial data for calibration as well as for localization and providing one or more indoor-location based services based on localization of a mobile device in the indoor space. As an example, the grid map can be a representation of the indoor space, for instance, of the floor plan of the indoor space, in terms of the hierarchically arranged polygonal tiles forming the tessellated grid structure as well as indicative of the various map constraints in the floor plan along with the tessellated grid structure.

The polygonal tiles used for creating the grid may have various shapes and may be such that the polygonal tiles, when abutting together, can substantially fill the indoor space. In one example, the polygonal tiles may have a symmetrical polygonal shape, such as a symmetrical hexagonal shape. In another example, the polygonal tiles may have the same asymmetrical shape or have different symmetrical shapes. In yet another example, the polygonal tiles may be made of two or more different symmetrical shapes, in the same hierarchical level. In one more example, the polygonal tiles may be made of two or more different symmetrical shapes in different hierarchical levels. For instance, one hierarchical level can include a first set of polygonal tiles that are of a first symmetrical shape and another hierarchical level can include a second set of polygonal tiles that are of a symmetrical second shape, and a number of polygonal tiles in the lower hierarchical level are substantially contained in or cover a single polygonal tile of the set in the higher hierarchical level. For instance, the second set of tiles in the lower hierarchical level can be triangular tiles whereas the first set of tiles in the higher hierarchical level be hexagonal or rhombus-shaped. In addition, in the same example, in case the tiles in the lower hierarchical level are triangular, and the ones in the higher hierarchical level are rhombus-shaped, there may be a still higher hierarchical level which may have hexagonal tiles substantially containing within it the rhombus-shaped tiles as well as the triangular tiles of the lower hierarchical levels. Such interlinking of the polygonal tiles in different hierarchical levels can vastly enhance the flexibility with which the spatial indexing can be used in the present subject matter. For example, such a hierarchical structure can be embodied as a tree (or a tree-like) data structure, which allows for an effective manner of structuring of the acquired information as well as retrieval of the information from a particularly large collection of data such as that used for localization.

In said examples, the polygonal tiles so tessellated can allow for effective operation in respect to the spatial indexing. The tessellation of the tiles can offer a dense packing for any lattice at any given hierarchical level. Therefore, from spatial data acquisition perspective, such a polygonal tiling can provide a high degree of quantization for a given hierarchical level and a given area of the indoor space. In addition, the packing the polygonal tiles at each level is done in such a manner that no regions in the indoor space remain unmapped against the grid and, therefore, the effectiveness of the grid for acquiring the spatial data is substantially high.

The spatial data can include variations, temporal or otherwise, in sensor data obtained from the mobile device which can indicate the instantaneous location of the mobile device, say in an absolute or local manner. In one example, global or absolute coordinates, such as geographical coordinates in the form of longitudinal and latitudinal information, to indicate the instantaneous location. In other examples, a local coordinate system, for instance, associated with the indoor space, can be used for indicating the instantaneous location. In still other examples, any other manner of indicating the instantaneous location may be used, for instance, without using any coordinate system.

In addition, as mentioned above, the present subject matter also relates to aspects of calibration in a targeted manner, such that the calibration is efficient and the fingerprint data, (i.e., the calibrated spatial data) so obtained as a result of the calibration is effective in providing accurate localization. In order to build the fingerprint repository, spatial data may be collected at known locations, i.e., for each of the georeferenced polygonal tile in the various hierarchical levels in the grid. The calibration is performed by collecting the spatial data using a data collection device, such as a mobile phone, in the various polygonal tiles in the grid to collect data.

According to an aspect, the targeted manner of calibration is a map-driven manner of calibration. In other words, the calibration is done on the basis of a pre-existing knowledge of the acquisition of spatial data at certain locations and the lack of acquisition at certain other. Accordingly, the acquisition of spatial data can be performed in a targeted manner, which can allow for an efficient manner of data acquisition. At the same time, the provision of the tessellated or tiled grid may allow for appropriate representation of the indoor space, for instance, the geometry of the indoor space, and can be used to access and acquire the spatial data owing to the indoor space having been divided into multiple polygonal tiles. Further, with the provision of the hierarchical structure of the grid, a hierarchical level can be selected to select, for instance, the size of the polygonal tile for which the data is to be acquired. For instance, depending on whether a high spatial resolution of the data acquisition is required or a low spatial resolution is required, the hierarchical level for which the spatial data is to be acquired can be selected. Accordingly, a balance may be achieved between efficiency of acquiring the data and the accuracy with which the data can help perform the localization, or a deliberate choice may be made to prefer one over the other.

In addition, as part of the calibration process, the present subject matter envisages a feedback mechanism built-in which can be helpful at the time of acquisition of the spatial data and provide feedback for the adequate and effective, as well as efficient acquisition of data. For example, the feedback mechanism can guide a calibrator to acquire the data from regions or locations for which the spatial data has not been acquired or for which sufficient spatial data is not available. Accordingly, in an aspect, a path may be defined, connecting the polygonal tiles at the selected hierarchical level, for acquiring the data. The path, in one example, may be the shortest route connecting the polygonal tiles for which the spatial data has not been acquired and may be substantially continuous while connecting the polygonal tiles. Additionally, the feedback mechanism may also allow the calibrator to pace the acquisition of the spatial data so that adequate amount of spatial data is captured without the calibrator having to spend more than required time at any location for acquiring the data. In addition, such a manner of acquiring data is natural for the calibrator to walk and is less mentally taxing, and reduces hassle for the calibrator by requiring minimal input from the calibrator to the data collection device and, therefore, the calibration is easier and faster.

Accordingly, combined with the grid structure used for representing the indoor space, the technique of the present subject matter can be used for calibrating large spaces in a considerably less time and the spatial resolution of the data being acquired can be selected, depending on the requirement as well as the choice between accuracy and speed of data acquisition. As mentioned above, the grid having the polygonal tiles in various tessellated hierarchical levels may provide for a tightly packed map which can be used for traversing the indoor space, by traversing neighboring polygonal tiles, for the purposes of data acquisition for calibration as well as for the purposes of performing localization. The spatial data can be smoothly acquired without any interruptions because of the closely packed structure of the polygonal tiles. For example, in case of hexagonal tiles, the spatial data can be acquired in a structured manner, such as a "ring" of hexagonal tiles which gradually grows, in the three-dimensional space. Accordingly, according to an aspect, the spatial data can be collected along with a spatial gradient associated therewith which indicates the variations in the spatial data from one polygonal tile to another. For instance, inertial sensor data, unlike Wi-Fi and BLE signals, may not be absolute in nature in the sense that they may be unable to uniquely identify a location in the indoor space based on a reading at a single spatial point or region. Such signals or spatial data may include, for instance, barometric measurements indicating changes in atmospheric pressure, for example while a user is going up or down an escalator, and magnetic field signal, for example, indicating variations when a user walks past an Electronic Article Surveillance or a large metallic electronic equipment such as an elevator or an escalator. However, such signals may be of particular use when captured with their spatial gradient. The provisions of the present subject matter, unlike the conventional techniques, can capture the spatial variations in the acquired spatial in region, along a path, or the entire indoor space.

Although the hierarchical structure, as envisaged by the present subject matter, has been described with the polygons higher in the hierarchy having a bigger size and smaller-sized polygonal tiles at lower levels of the hierarchy, any other manner of correlating the shapes and sizes of the polygonal tiles in the multiple layers may be implemented. For example, the hierarchy may be inverted and, instead, a larger polygonal tile may be lower in the hierarchy with respect to the smaller polygonal tiles.

Also provided herein in a server device including a processor and a memory storing a set of computer instructions and a computing device including a processor and a memory. In both, the instructions are executable in the processor to perform calibration of data and localize the mobile devices as described above.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame. In other examples, other forms of coordinates, such as spherical coordinates or polar coordinates may be used for spatially indicating the locations, as envisaged in the present subject matter.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, laptop computers, wearable mobile devices, and tablet mobile devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage mobile devices, such as hard drives on personal computers or servers. Other examples of computer storage mediums include portable memory storage units, flash memory (such as carried on smartphones, multifunctional mobile devices or tablets), and magnetic memory. Computers, terminals, network enabled mobile devices (e.g., mobile devices, such as cell phones) are all examples of machines and mobile devices that utilize processors, memory, and instructions stored on computer-readable mediums. Additionally, embodiments may be implemented in the form of computer-programs, or a computer usable carrier medium capable of carrying such a program.

System Description

Figure 1:
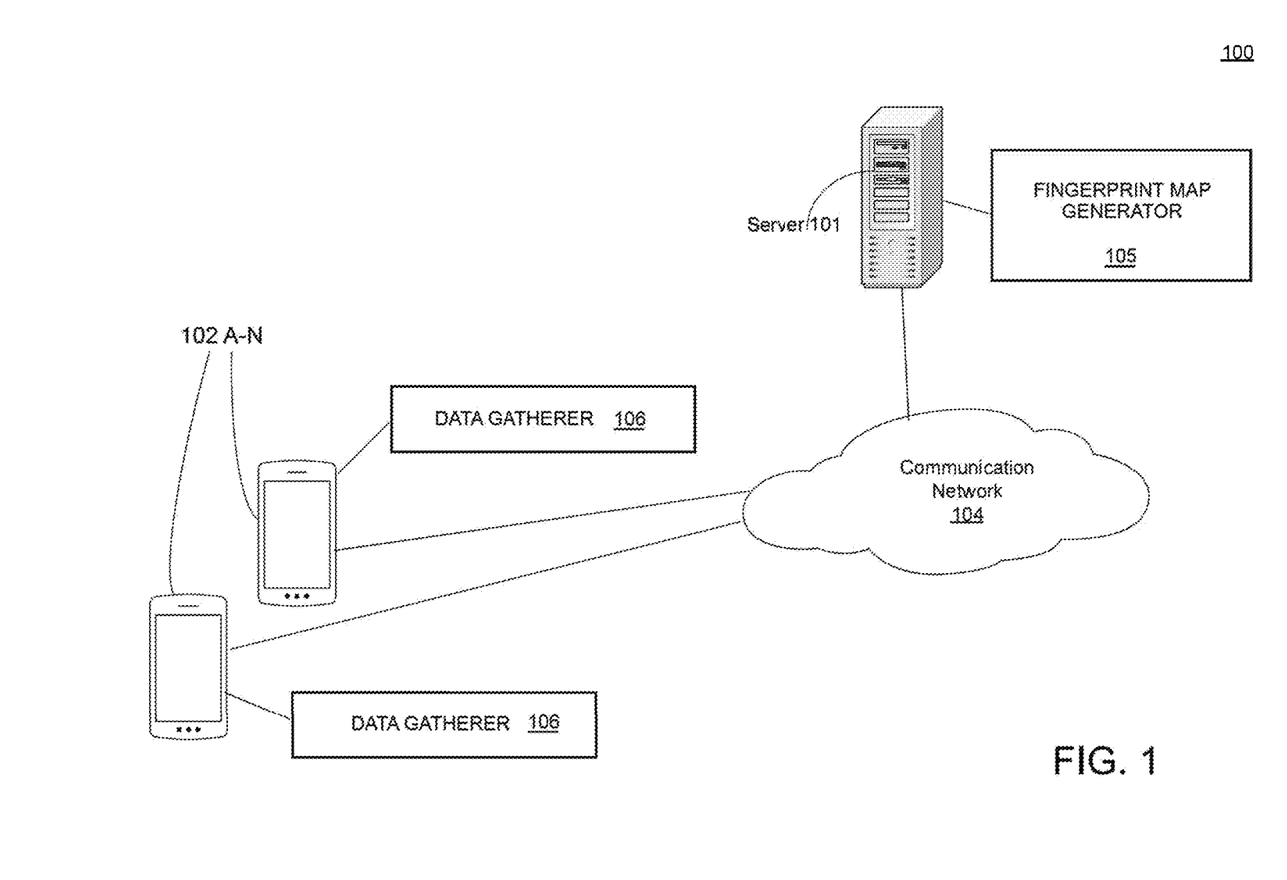
FIG. 1 illustrates, as an example, a system for targeted calibration of an indoor space.

FIG. 1 illustrates, in an example embodiment, a system for targeted calibration, for example, for generating a fingerprint map for an indoor area, by acquiring spatial data in a structured, targeted manner. The server 101, includes a fingerprint map generator 105, and is communicatively connected via communication network 104 to a plurality of data collection devices 102a-n, also referred to herein as calibration devices 102a-n. Calibration devices 102a-n include a data gatherer 106, which in one embodiment, may be included in a calibration software application downloaded and installed at individual ones of calibration devices 102a-n.

Figure 2:
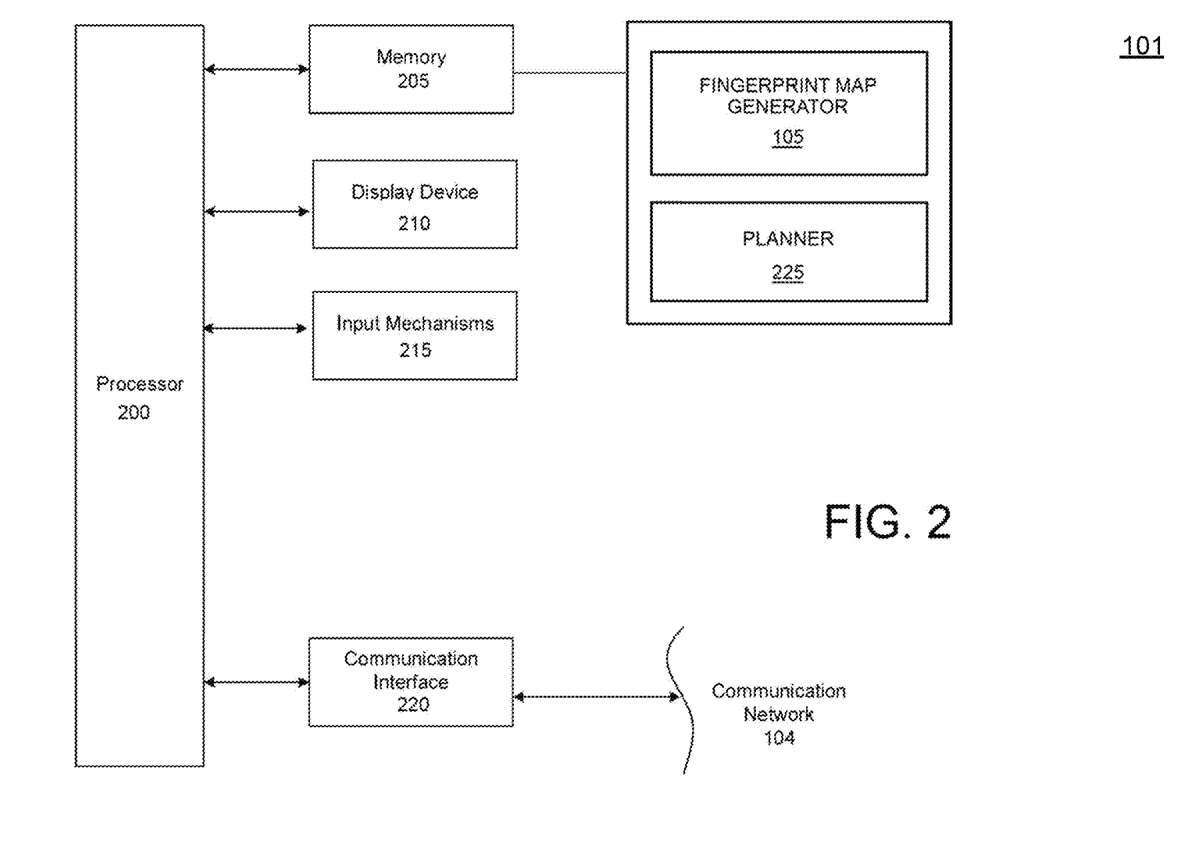
FIG. 2 illustrates, as an example, an architecture of a computer server for targeted calibration of an indoor space.

FIG. 2 illustrates an example architecture of a server computing device for targeted calibration of the indoor space. Server 101, in an embodiment architecture, may be implemented on one or more server devices, and includes processor 200, memory 205 which may include a read-only memory (ROM) as well as a random access memory (RAM) or other dynamic storage device, display device 210, input mechanisms 215 and communication interface 220 for communicative coupling to communication network 104. Processor 200 is configured with software and/or other logic (such as from a trusted GPS logic module) to perform one or more processes, steps and other functions described with implementations, such as described by FIGS. 1 through 5 herein. Processor 200 may process information and instructions stored in memory 205, such as provided by a random-access memory (RAM) or other dynamic storage device, for storing information and instructions which are executable by processor 200. Memory 205 also may be used for storing temporary variables or other intermediate information during execution of instructions to be executed by processor 200. Memory 205 may also include the ROM or other static storage device for storing static information and instructions for processor 200; a storage device, such as a magnetic disk or optical disk, may be provided for storing information and instructions. Communication interface 220 enables server 101 to communicate with one or more communication networks 104 (e.g., cellular network) through use of the network link (wireless or wired). Using the network link, server 101 can communicate with calibration devices 102 a-n.

The server 101 may include instructions stored in RAM of memory 205, and includes the fingerprint map generator 105 and the planner 225.

Processor 200 uses executable instructions stored in fingerprint data acquisition module to acquire fingerprint data within the area by a plurality of mobile devices 102a-n. The area may be an indoor area within a shopping mall, an airport, a warehouse, a university, or any at least partially enclosed building. In embodiments, the fingerprint data, as acquired from mobile devices 102a-n, further includes respective time-stamps, whereby the orientation, the magnetic field strength and direction, the received wireless signal strength, the barometric pressure, and the position data can be time-correlated for any given position along a trajectory or trajectory segment of the mobile devices, in accordance with the respective time-stamps. Additionally, when the sampling times and sampling rates applied to particular ones of device sensors are different, the signal and sensor information as measured may be aggregated and fused, for example, time-averaged across particular periods of time, with the aggregated and fused value being used to represent the signal information at any given instance of time within that particular period of time in which the signal information is aggregated and fused.

Figure 21:
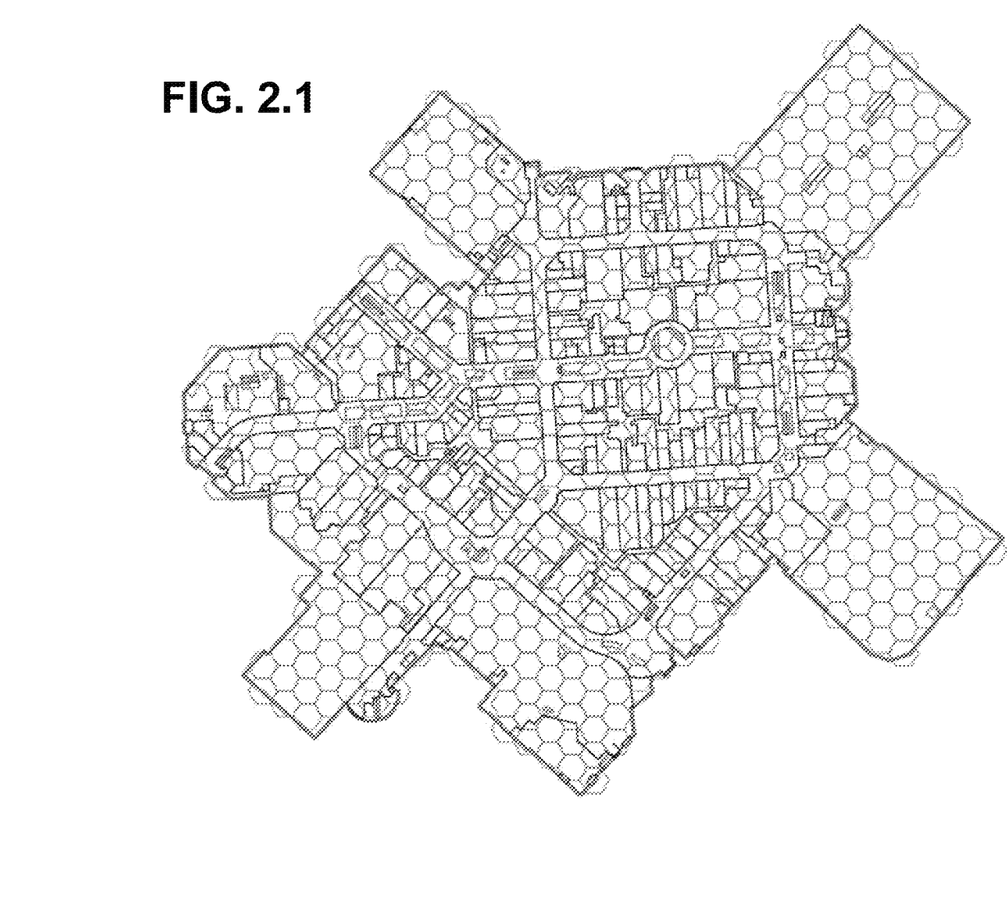
Figure 22:
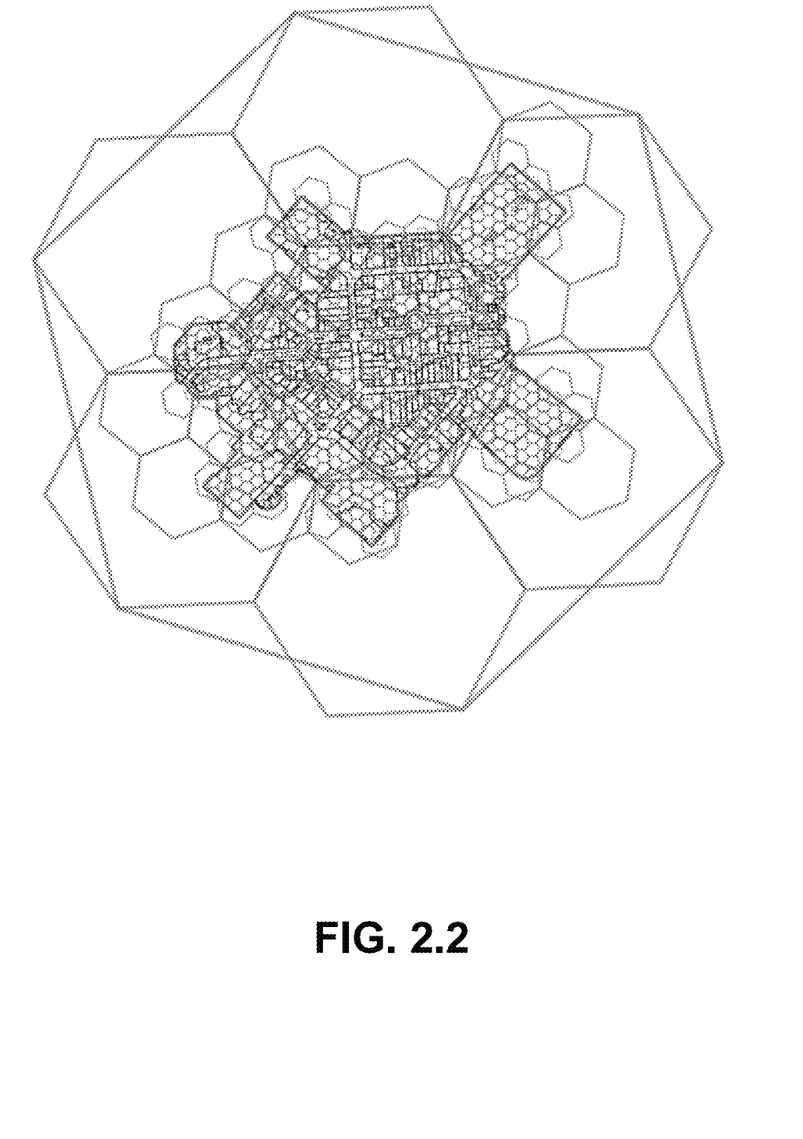

To begin with, as part of the operation of the server 101, the planner 225 can generate a grid map which is further supplemented and processed for use for calibration of the indoor space, among other things. The planner 225 can represent the indoor space as a grid having multiple planes arranged in a stack. As an example, the planner 225 may obtain the floor plan of the indoor space in any raster format, and begin by dividing the floor plan into a plurality of polygonal tiles, shown as an example in FIG. 2.1, and overlay the floor plan with the stacked planes. Each plane is made of tessellated polygonal tiles, i.e., polygonal tiles abutting adjacent polygonal tiles and the multi-planar structure forms a hierarchically-related structure of such polygonal tiles in which the polygonal tiles in one plane of the hierarchical structure bear a relationship with the polygonal tiles in the plane above and below that plane. Such planes, also referred to as the hierarchical levels of the grid, contain the polygonal tiles which form the basic building block of the representation which is used to depict the indoor space. The planner 225 can generate the polygonal tiles in each hierarchical level to be so sized and shaped that a polygonal tile higher in the hierarchical level can be, with certain approximation, represented by a collection of polygonal tiles in at least one lower hierarchical level, whether immediately adjacent to the hierarchical level or not. For instance, a polygonal tile higher in the hierarchical structure can contain within it a plurality of smaller polygonal tiles that are lower in the hierarchical structure. As an example, the indoor space represented as the hierarchical grid of multi-layered polygons of different sizes is shown in FIG. 2.2. In the example shown, the grid may be made of two-dimensional layers of polygonal tiles. In other examples, however, the hierarchical grid may be a three-dimensional grid involving three-dimensional volumes which are binned for carrying out the operation as envisaged by the present subject matter.

The planner 225 may use polygonal tiles of various shapes and sizes for creating the grid. In one example, planner 225 may use symmetrical polygonal-shaped tiles, such as a hexagonal tile, for creating the grid. In another example, planner 225 may use the polygonal tiles that have the same asymmetrical shape or have different symmetrical shapes. For instance, the planner 225 may use differently sized triangles to cover the entire indoor space, represented by a hierarchical level in the grid. In yet another example, the planner 225 may use polygonal tiles made of two or more different symmetrical shapes, in the same hierarchical level as part of representing the indoor space using the grid.

In one other example, the planner 225 may use polygonal tiles made of two or more different symmetrical shapes in different hierarchical levels. The planner 225 may make one hierarchical level using a first set of polygonal tiles that are of a first symmetrical shape and make another hierarchical level using a second set of polygonal tiles that are of a symmetrical second shape, with the polygonal tiles in the lower hierarchical level and the higher hierarchical level bearing a genus-species relationship with each other. For instance, the planner 225 can use symmetric triangular tiles in the lower hierarchical level and use rhombus-shaped tiles in the higher hierarchical level. In addition, in the same example, in case the tiles in the lower hierarchical level are triangular, and the ones in the higher hierarchical level are rhombus-shaped, the planner 225 may use hexagonal tiles in a still higher hierarchical level which may substantially contain within it the rhombus-shaped tiles as well as the triangular tiles of the lower hierarchical levels.

In said examples, the polygonal tiles having a symmetrical shape can allow for effective operation in respect to the spatial indexing. For instance, the symmetrical hexagon-shaped polygonal tiles, whether formed as a complete hexagonal tile or by the combination of other symmetrical or asymmetrical polygonal tiles, can offer the densest packing for any lattice at any given hierarchical level and can, therefore, provide a high degree of quantization for calibration for a given hierarchical level and a given area of the indoor space. This means that the hexagonal tile can be selected at a high resolution which, in turn, can perform calibration at a granular level. In addition, the hexagonal tiles allow for packing such that no regions in the indoor space remain unmapped. Therefore, the natural asymmetry in a hexagonal tile can provide high accuracy and a smooth approximation of the curves contained in the tiles. In addition, the centroids of all the adjacent polygonal tiles are equidistant and, therefore, this can allow for smooth transitions between the polygonal tiles in all directions in an orderly manner.

Further, the planner 225 can achieve the spatial indexing of the grid by correlating the physical entities and the polygonal tiles in various layers of the hierarchical structure, such that the georeference of each physical entity is mapped with the corresponding polygonal tile in each hierarchical level. The georeference of the physical entity, correlated with the polygonal tile, can be any information which can be used to indicate the position or location of the physical entity or the polygonal tile(s) associated therewith.

The planner 225 can, thus, represent the indoor space by spatially indexing the grid using the hierarchical structure of the polygonal tiles and the georeferenced physical entities. The planner 225, in the present example, can interlink the polygonal tiles in different hierarchical levels to enhance the flexibility with which the spatial indexing implemented. For example, with such a spatial indexing, the planner 225 can create a tree (or a tree-like) hierarchical structure, which allows for an effective manner of retrieval of the information from a particularly large collection of data such as that used for localization.

In an example, using the spatial indexing as explained above, the server 101 may perform calibration of the indoor space for generating a fingerprint map which can be further used for localization. In order to build a fingerprint repository for indoor positioning applications, the server may collect the spatial data (referred to as reference data) at known locations, i.e., for each of the georeferenced polygonal tile in the various hierarchical levels in the grid. The calibration is performed by collecting the spatial data using a data collection device, such as a mobile phone, in the various polygonal tiles in the grid to collect data.

A sequence of positions or locations that constitute a navigation path traversed by mobile device 110 relative to the pedestrian area may be mapped for fingerprint data during a fingerprint calibration process. In some embodiments, given that sampling times and sampling rates applied in conjunction with particular mobile device sensors may be different, the signal and sensor information as measured during a fingerprint calibration process may be aggregated and fused, for example, time-averaged across particular periods of time, with the aggregated and fused value being used to represent the signal information at any given instance of time within that particular period of time in which the signal information is aggregated and fused.

In operation, the server 101 can cooperate with the calibration devices 102 *a-n*, present in an indoor space for which the calibration is to be performed. to acquire spatial data for that indoor space and then generate a fingerprint map for the indoor space, based on the calibrated spatial data.

According to an aspect, the fingerprint map generator 105 at the server 101 can track and visualize the acquisition of the spatial data by splitting up a floor plan into discrete cells along the indoor area that need to be calibrated, to thereby generate the grid plan. Accordingly, the indoor space to be calibrated can divided into a grid of a plurality of polygonal tiles arranged in a size-wise hierarchy and tessellated at each level of the size-wise hierarchy. The calibration device 102

*a-n*, such as the data gatherer 106 of the calibration devices 102 *a-n*, can acquire the spatial data for each of the discrete polygonal tiles in a predefined region, such as along the main hallways of the indoor space, and send the same to the server 101. The fingerprint map generator 105 may associate an indicator, such as a score, with each polygonal relating to the calibration or the data acquisition for each polygonal tile. For example, the indicator can reflect the number of environmental signals as part of the spatial data that have been measured and acquired for a given polygonal tile.

The fingerprint map generator 105 may then use this information, regarding the spatial data already acquired or not for each polygonal tile, to generate a distribution map indicating which areas of the indoor space still need to be calibrated and which areas have already been calibrated. Accordingly, the fingerprint map generator 105 can create a preliminary discretized spatial map of the calibrated spatial data in the predefined region, based on an association between the first set of spatial data already acquired for the few of the polygonal tiles and the corresponding polygonal tile. In other words, the preliminary discretized spatial map can be indicative of the discrete sets of the gathered calibration data, per polygonal tile, which have been represented for the entire predefined region.

Using the preliminary discretized spatial map, the fingerprint map generator 105 can identify a group of polygonal tiles in the predefined region having density of calibrated spatial data less than a threshold density, i.e., polygonal tiles for which sufficient calibration data has not been gathered. Therefore, in the subsequent, data acquisition cycles of the data gatherer 106, the fingerprint map generator 105 may instruct the calibration device 102 *a-n* to acquire a second set of spatial data for only that identified group of polygonal tiles. Accordingly, in the subsequent data acquisition cycle, the spatial data is only to be collected for a selected, narrower set of polygonal tiles. As will be understood, the density of the spatial data as determined for each polygonal tile can be based on the score associated with the tile by the fingerprint map generator 105. Further, depending on the polygonal tiles for which the data has been acquired, the calibration device 102 can run the appropriate number of data acquisition cycles.

Therefore, in the beginning of the calibration process, the fingerprint map generator 105 can mark all the polygonal tiles as uncalibrated. As the data gatherer 106 of the calibration devices 102 *a-n* collects data the fingerprint map generator 105 can keep updating the indicator associated with each polygonal tile, for instance, in the preliminary discretized spatial map are updated and the preliminary discretized spatial map keeps dynamically changing or updating as the data is continually acquired by the data gatherer 106 and obtained by the fingerprint map generator 105.

Accordingly, as the calibration device 102 *a-n* moves in the predefined region of the indoor space and as new spatial data is gathered for the polygonal tiles, the calibration device 102 *a-n* may receive immediate feedback in the form of, for example, a feedback based on the preliminary discretized spatial map, that can be available to the calibration device 102 *a-n* in real-time. Therefore, as the spatial data is collected and the polygonal tiles are calibrated one-by-one, the calibration device 102 *a-n* as well as the fingerprint map generator can, in real-time, get an indication as to the progress of the calibration process. As an example, based on the feedback, in real-time, the fingerprint map generator 105 can keep determining the subsequent sets of polygonal tiles that the calibration device 102 *a-n* acquire spatial data from and, accordingly, in real-time may instruct the calibration device 102 *a-n* regarding the polygonal tiles from which the gathering the spatial data remains to be done. In addition, As the scores associated with the polygonal tiles in the preliminary discretized spatial map are updated, the same may be broadcast to other calibration devices 102 *a-n* in the network 104 linked to the server 101 for calibrating the indoor space. This allows for multiple calibration devices 102 *a-n* to by in sync with one another and can enable faster calibration and avoidance of wastage of time and resources due to calibration of overlapping regions or polygonal tiles.

According to an aspect, as part of instructing the calibration devices 102 *a-n*, the fingerprint map generator 105 may generate a substantially continuous path to connect the group of polygonal tiles from which the remnant or uncollected spatial data is to be gathered. In other words, the fingerprint map generator 105 can create a route, substantially continuous in structure, for the calibration device 102 *a-n* that the calibration device 102 can follow for completing calibration by gathering spatial data from the polygonal tiles for which the data acquisition remains pending. For instance, the substantially continuous path can be understood as a series of lines connecting the polygonal tiles for which the data is to be acquired. In an example, if two polygonal tiles are far from each other by more than, say a threshold distance, the path may be broken and the calibration device 102 can show the path as constituted of two separate paths separated by a small distance. In said example, the calibration device 102 may still gather the data for the two paths as part of a single event of data acquisition. The fingerprint map generator 105 may use the preliminary discretized spatial map as the basis for generating the path.

As will be understood, in an example, as the data from the polygonal tiles is gathered in real-time, as explained above, the route or the path may also be dynamically modified. Therefore, as the preliminary discretized spatial map is updated with the calibration information, the fingerprint map generator 105 may keep updating or revising the route that the calibration device 102 *a-n* must take to gather spatial data for the indoor space to complete the calibration of the predefined region of the indoor space.

In an example, the path generated for gathering the spatial data from the remaining polygonal tiles may be an optimized route connecting the group of polygonal tiles, the route optimized based on, for instance, a combination between the shortest route and the route that would be the most beneficial to the calibration process in terms of the amount of spatial data that can be gathered on the route.

Once the calibration is completed, the fingerprint map generator 105 can generate a fingerprint map for the indoor space, based on the preliminary discretized spatial map and the second/subsequent set of spatial data. The fingerprint map may be indicative of the discretized distribution of the calibrated spatial data in the indoor space and can be used for localizing devices in the indoor space. In an example, the fingerprint data can be further integrated with the georeferences of the various physical entities and with the hierarchical grid to generate a grid map of the indoor space which can be further used for localizing the mobile device 110.

Further, the hierarchical grid structure of the present subject matter can also allow different resolutions to be used for acquiring the spatial data within the hierarchical structure, for example, based on a given requirement. For example, a high resolution, i.e., at lower hierarchical level having small polygonal tiles, may be used when acquiring data at a higher level of granularity, while a low resolution, i.e., at higher hierarchical levels having large polygonal tiles, may be more useful when acquiring, accessing, or processing a large set of spatial data. The hierarchical level for acquiring the data may also be dependent on the trade-off to be achieved between the efficiency of calibration and the accuracy with which the fingerprint data can be used, for example, for localization. Moreover, resolution requirements may vary amongst different regions or environments in the indoor space, such as between open and congested space. For example, for the same indoor space, for a crowded space, such as a narrow hallway, a higher resolution of the grid can be selected for acquiring the data, whereas for open spaces, a lower resolution of the grid can be selected for acquiring the data.

As a consequence of the calibration by the server 101, in an example, the server 101 may also include a fingerprint data repository (not shown in figures), which may be communicatively accessible to mobile devices, via the network 140, for localization.

The terms fingerprint and fingerprint data as used herein refer to time-correlated or time-stamped, individual measurements of any of, or any combination of, received wireless communication signal strength and signal connectivity parameters, magnetic field measurements and barometric pressure measurements, and mobile device inertial sensor data at known, particular locations within an area being traversed, or anticipated for traversal, by the mobile device. In other words, a fingerprint includes a correlation of sensor and signal information including, but not necessarily limited to wireless signal strength, magnetic and barometric data, and inertial sensor information time-correlated for respective positions or coordinate locations within the area or facility being traversed. For instance, barometric fingerprint data associated with contiguous locations or positions may establish a pattern or signature that uniquely correlates to that particular sequence of locations or positions. Once a particular as-measured value, a pattern or signature based on any one or more of received wireless communication signal strength and signal connectivity parameters, magnetic field parameters or barometric pressure parameters, and mobile device inertial sensor data is detected or recorded by the mobile device 110, the value or pattern as detected may be matched to a reference fingerprint stored in a fingerprint map of a given facility, for example as stored in positioning fingerprint data repository, to identify the unique position of the mobile device relative to the facility, a process also referred to herein as localization.

Figure 3:
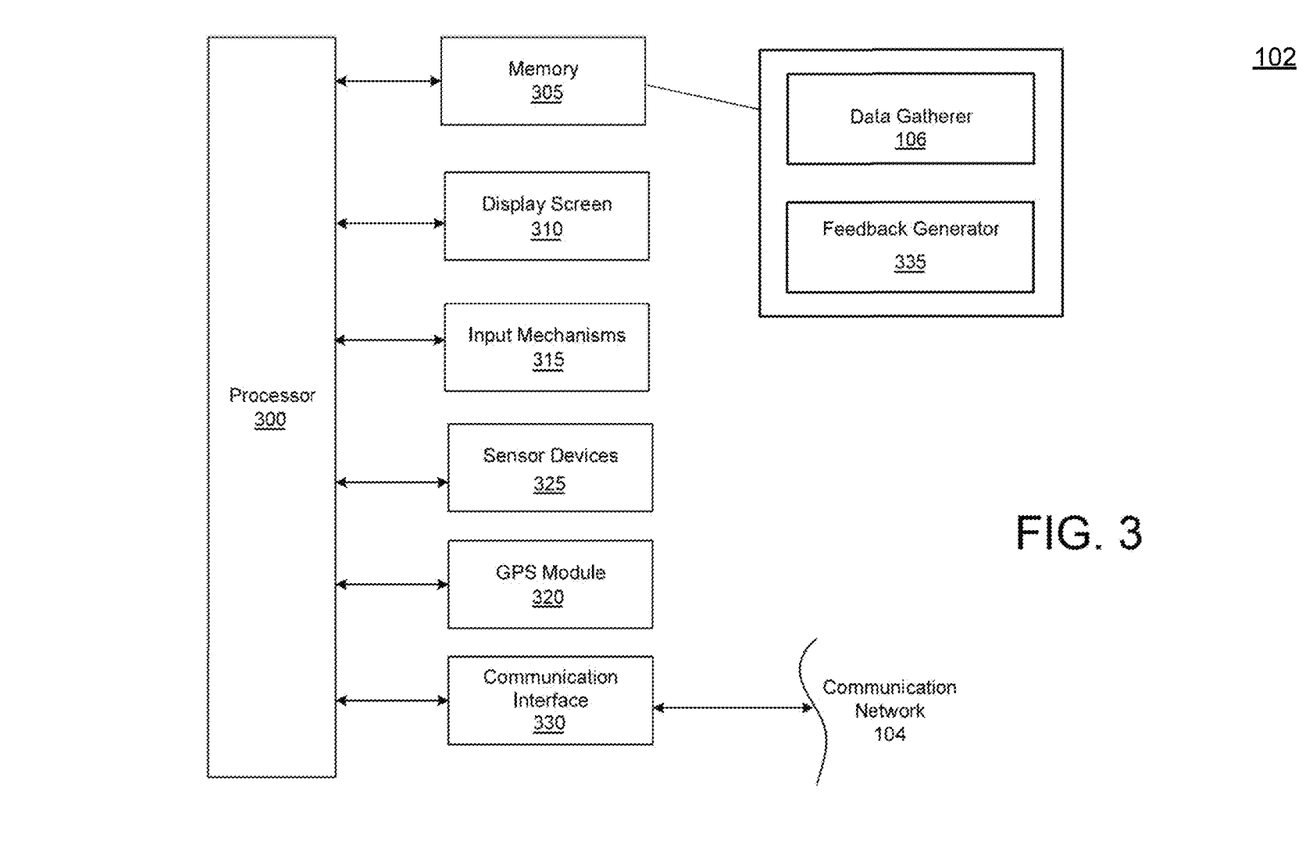
FIG. 3 illustrates, as an example, an architecture of a mobile device for localizing in an indoor space based on selection of spatial-resolution.

FIG. 3 illustrates an example architecture of the calibration device 102 from amongst and representative of one of a plurality of mobile devices 102a-n for acquisition of spatial data in conjunction with GPS data or any other type of locational data for particular positions or locations within the indoor area. As used herein, the term calibration device 102 refers to any singular mobile device among calibration devices 102 a-n. In one embodiment, calibration device 102 may correspond to, for example, a cellular communication device (e.g., smartphone, tablet, etc.) that is capable of telephony, messaging, and/or data computing services. In variations, calibration device 102 can correspond to, for example, a tablet or a wearable computing device.

Accordingly, in said examples, the spatial data, as referred above, that is acquired by the calibration device 102 for the purposes of calibration of the indoor space can include, for instance, the wireless signal data generated by the calibration device. The wireless signal data including signal strength and connectivity, such as Wi-Fi received signal strength and Bluetooth received signal strength connectivity and measurements, inertial data, barometric data, magnetic data including field strength and direction data, and other device data that may be gathered at positions along a trajectory of motion and used as input parameters for joint fusion with fingerprint location data. In some embodiments, the joint fusion, also referred to as data fusion herein, can be performed using a Bayesian filter, a Kalman filter, a Rodriguez filter, or any suitable method of jointly fusing input data to determine a position of the mobile device, or localize the mobile device, based on the data fusion. Estimating a trajectory of the mobile device in accordance with the data fusion may be based on the wireless signal data, inertial data, barometric data, magnetic data and other device data may include such as, but not limited to, instantaneous inertial sensor measurements including directional heading and step length, short-term inertial sensor measurement history within a specified time window, Wi-Fi received signal strength and connectivity measurements, Bluetooth received signal strength measurements, barometric-based pressure data, magnetic field data including field strength and direction, floor layout map physical constraints such as doors, walls and entryways, environment landmarks, cellular communication signal strengths and GPS signal data.

The calibration device 102 may include processor 300, memory 305, display screen 310, input mechanisms 315 such as a keyboard or software-implemented touchscreen input functionality, barcode, QR code or other symbol- or code-scanner input functionality. The calibration device 102 may include global positioning system (GPS) module 320, with the GPS and cellular data acquired capable of providing particular locations of calibration device 102. Calibration device 102 may also include sensor functionality by way of sensor devices 325. Sensor devices 325 may include any of inertial sensors (accelerometer, gyroscope), magnetometer or other magnetic field sensing functionality, and barometric or other environmental pressure sensing functionality. Calibration device 102 may also include capability for detecting and communicatively accessing wireless communication signals, including but not limited to any of Bluetooth, Wi-Fi, RFID, and GPS signals. The calibration device 102 further includes the capability for detecting and measuring a received signal strength of the wireless communication signals. In particular, calibration device 102 may include location determination capability such as by way of GPS module 320, and communication interface 330 for communicatively coupling to communication network 104, such as by sending and receiving cellular data over data channels and voice channels.

The calibration device 102, among other components, may include the data gatherer 106 and a feedback generator 335 which may include processor-executable instructions stored in RAM, in one embodiment, in the memory 305 and may include sub-modules for carrying out various operations and functions.

In operation, the calibration device 102 may begin operation when the calibration device 102 receives instructions to acquire spatial data in a predefined region in an indoor space. In addition, the instructions may include information regarding a group of polygonal tiles, of the tessellated grid used to represent the indoor space, covering the predefined region and instructions to gather the spatial data at a selected hierarchical level in the size-wise hierarchy in the grid. The selection of the hierarchical level, as explained earlier, can be based on the spatial resolution at which the spatial data is to be acquired.

Accordingly, in response to the instructions, the data gatherer 106 may commence acquiring the spatial data for the polygonal tiles, as instructed, along the substantially continuous path connecting the group of polygonal tiles to be traversed for gathering the spatial data. In an example, based on the instructions and an image of the grid or the preliminary discretized spatial map, the data gatherer 106 may generate the substantially continuous path. For instance, based on the scores associated with the polygonal tiles in the preliminary discretized spatial map, the data gatherer 106 may identify the polygonal tiles which have the density of spatial data less than the threshold and, for identified polygonal tiles, the data gatherer 106 may determine the optimized route that connects the polygonal tiles which can be traversed to acquire the missing spatial data for the indoor space. In another example, the instructions received from the server 101 to acquire the spatial data include therein the substantially continuous path generated by the server 101 received at the calibration device 102.

Further, the feedback generator 335 can, based on, for example, the manner of acquisition of data by the calibration device 102, may generate a feedback. The feedback may indicate whether the calibration device 102 is in conformance, in real-time, to the instructions from the server 101 to follow the substantially continuous path. For instance, the feedback generator 335 can monitor the real-time parameters associated with the calibration device, such speed, location, orientation, and other such inertial parameters, to determine whether the calibration device 102 conforms to the path in terms of the pace of traversal. For instance, the pace may be indicative of whether the calibration device 102 follows the path with an acceptable deviation of a threshold range or whether the calibration device 102 conforms with the speed with which the calibration device 102 must traverse the path to effectively gather the spatial data along the path.

In case the feedback generator 335 determines that the movement of the calibration device 102 deviates from the path or does not conform to the speed or orientation as per the instructions from the server 101, the feedback generator 335 may generate a feedback signal, for example, on the calibration device 102. In an example, the feedback signal may be generated as a visual signal or an audio signal or both to inform the calibrator regarding the non-conformance. In another example, the feedback generator 335 may transmit the information regarding non-conformance outside the calibration device 102, such that the feedback signal may be generated outside the calibration device 102. For instance, the feedback signal, based on information from the feedback generator 335, be generated at the server 101. In response to the feedback, the acquisition of the spatial data along the substantially continuous path may be adjusted based on a pace of traversal of the substantially continuous path. In an example, in response to the feedback or otherwise, the data gatherer 106 may obtain a user input regarding modification in a parameter associated with the substantially continuous path. In other examples, even after the generation of the feedback, if the calibration device 102 does not conform to the path, or the instructions, then the spatial data so acquired may not be used for calibration. However, such data may be tagged, labelled, ad stored, in an example, for later use.

As an example, in case the calibrator is unable to conform to the original instructions, the calibrator may modify the path, or the pace, or orientation of the calibration device 102 for acquiring the spatial data. Consequently, based on the calibrator's or the user input, a modified continuous path may be generated which can be then followed or conformed to by the calibration device 102 for acquiring the spatial data. In an example, the modified path may include modification in the path or the modification in the pace at which the path must be traversed. As will be understood, even for the modified path, the feedback generator 335 can monitor the calibration device 102 for conformance and can generate a real-time feedback for indicating whether the calibration device 102 conforms to the modified path or not.

In an example, the movement as well as the feedback of conformance, in real-time, may be done through a UI of the calibration device 102. For example, once the route is generated, the calibrator may use the UI to initiate data acquisition. The UI may indicate the continuous path on the UI and an indicator, such as a moving dot, which changes position on the UI in real-time, in reference to the path on the UI. The indicator can indicate to the calibrator an expected position of the calibration device 102 along the path at a given point in time. At the same time, as mentioned above, the feedback generator 335 can monitor the actual position and based on comparison with the expected position, generate a feedback signal, for example, in case of a mismatch between the actual and the expected position beyond a threshold value. Further, the calibrator may access the UI and control the speed of the moving dot at any position along the path, to generate the modified path, as explained.

Methodology

Figure 4:
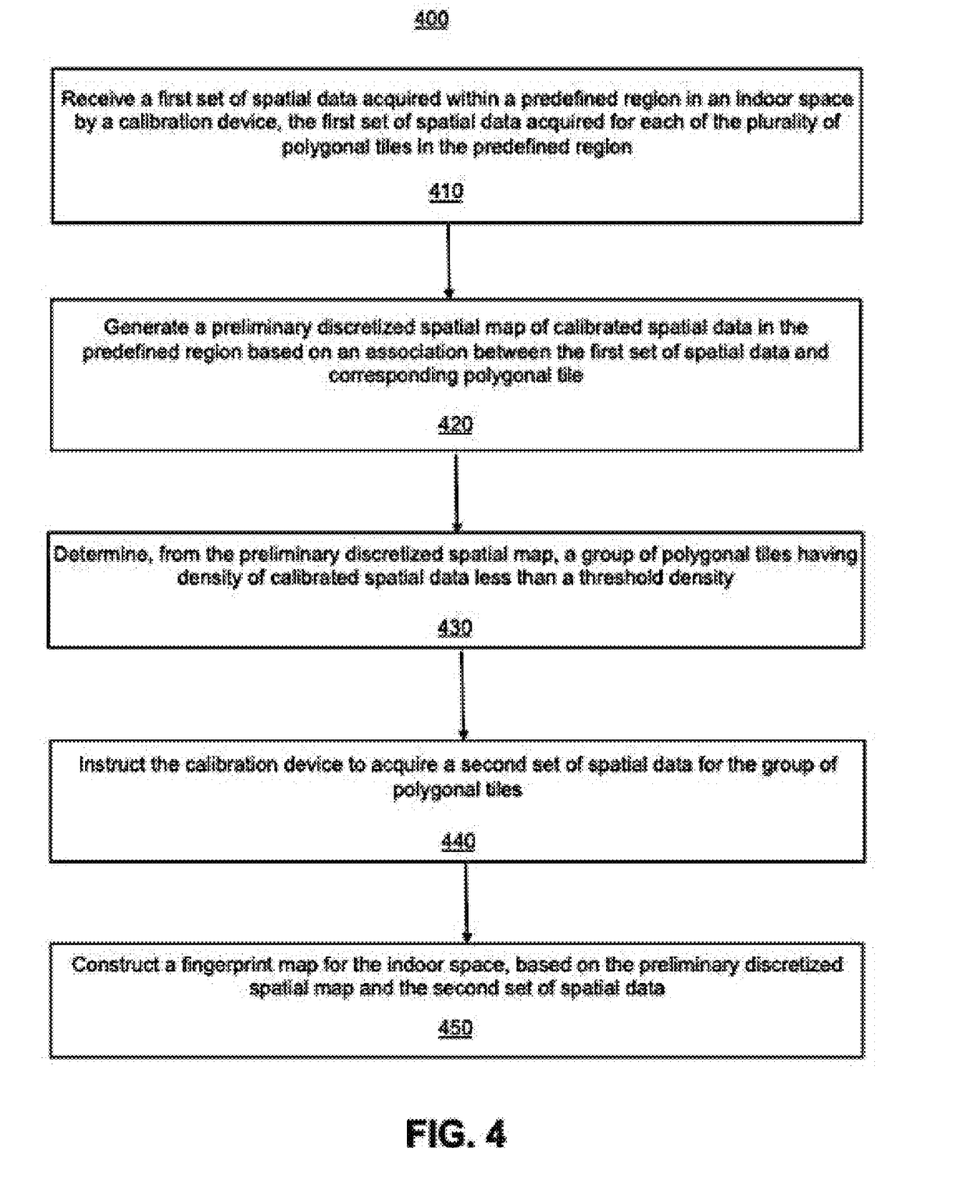
FIG. 4 illustrates, as an example, a method of enabling targeted calibration of an indoor space.

FIG. 4 illustrates, as an example, a method 400 of enabling targeted calibration of an indoor space. In describing examples of FIG. 4, reference is made to the examples of FIGS. 1-3 for purposes of illustrating suitable components or elements for performing a step or sub-step being described. For the sake of brevity, the detailed operation of the components or elements has not been repeated herein and will be understood to be associated with the respective step or sub-step being described.

It will be appreciated that some of the method steps may be deleted, modified, or more steps may be added. Also, the steps are not limited by the order in which they are performed. Some of the steps may be performed simultaneously as well.

Referring to FIG. 4 examples of method steps described herein are related to a server, such as the server 101, to facilitate spatial-resolution selection for localization of mobile devices, such as mobile device 110. According to one embodiment, the techniques are performed by the processor 200 executing one or more sequences of software logic instructions that constitute the fingerprint map generator 105 and the planner 225 of the server 101. In embodiments, fingerprint map generator 105 and the planner 225 may include the one or more sequences of instructions within sub-modules. Such instructions may be read into the memory 210 from machine-readable medium, such as memory storage mobile devices. Execution of the sequences of instructions contained in fingerprint map generator 105 and the planner 225 in the memory 210 causes the processor 200 to perform the process steps described herein. It is contemplated that, in some implementations, some of the sub-modules, or any other portions of executable instructions constituting fingerprint map generator 105 and the planner 225 may be hosted at a remote device other than at the server 101. In alternative implementations, at least some hard-wired circuitry may be used in place of, or in combination with, the software logic instructions to implement examples described herein. Thus, the examples described herein are not limited to any particular combination of hardware circuitry and software instructions.

At block 410, a first set of spatial data acquired within a predefined region in an indoor space by a calibration device 102 is received. The indoor space is represented as a grid of tessellated polygonal tiles arranged in a hierarchical structure of size-wise arranged polygonal tiles. In other words, the indoor space can be divided into a grid of a polygonal tiles arranged in a size-wise hierarchy and tessellated at each level of the size-wise hierarchy. The first set of spatial data may be acquired for each of the polygonal tiles in the predefined region. In another example, however, the first set of spatial data may be acquired for few of the polygonal tiles, while some polygonal tiles are such that the spatial data for them is not retrieved.

The polygonal tiles in each level or layer of the hierarchical structure bear a relationship with the polygonal tiles in the level above and below that level. The floor plan of the indoor space can be obtained in any raster format and overlaid with the stacked planes, where each plane is made of polygonal tiles abutting adjacent polygonal tiles, the polygonal tiles forming the basic building block of the representation which is used to depict the indoor space. Such a multi-planar structure forms the hierarchically-related structure of polygonal tiles in which the polygonal tiles in one hierarchical level or plane bear a relationship with the polygonal tiles in the plane above and below that plane. For instance, the polygonal tiles in each hierarchical level are so sized and shaped that a polygonal tile higher in the hierarchical level can be, with certain approximation, represented by a collection of polygonal tiles in at least one lower hierarchical level, whether immediately adjacent to the hierarchical level or not. For instance, a polygonal tile higher in the hierarchical structure can contain within it a plurality of smaller polygonal tiles that are lower in the hierarchical structure.

At block 420, a preliminary discretized spatial map of the calibrated spatial data in the predefined region is generated by linking the first set of spatial data and the corresponding polygonal tiles for which the spatial data has been acquired. Further, the preliminary discretized map can be generated based on a selection of a hierarchical level in the size-wise hierarchy, which can determine the resolution of the preliminary discretized spatial map, i.e., the size of the polygonal tiles for which the acquired spatial data is depicted in the preliminary discretized spatial map.

At block 430, from the preliminary discretized spatial map, a group of polygonal tiles are identified which have density of calibrated spatial data less than a threshold density. In other words, the group of polygonal tiles for which either the spatial data has not been collected or the collected spatial data is insufficient are identified. For example, as part of the receiving the first set of spatial data, a score is associated with each polygonal which indicates the calibration or the data acquisition for each polygonal tile. For example, the indicator can reflect the number of environmental signals as part of the spatial data that have been measured and acquired for a given polygonal tile.

At block 440, the calibration device, as a feedback, may be instructed to acquire a second set of spatial data for the group of polygonal tiles identified at block 430.

Further, at block 450, a fingerprint map is constructed for the indoor space, based on the preliminary discretized spatial map and the second set of spatial data. The fingerprint map may be indicative of the discretized distribution of the calibrated spatial data in the indoor space and usable for localizing devices in the indoor space. Further as will be understood that the fingerprint map is constructed for the indoor space, based on the preliminary discretized spatial map and the any number of subsequent sets of spatial data depending on the number of data acquisition cycles have to be performed to acquire the data for all the polygonal tiles at the selected hierarchical level for the predefined region, such that the density of the acquired spatial data is above the threshold for all such polygonal tiles in the predefined region.

Figure 5:
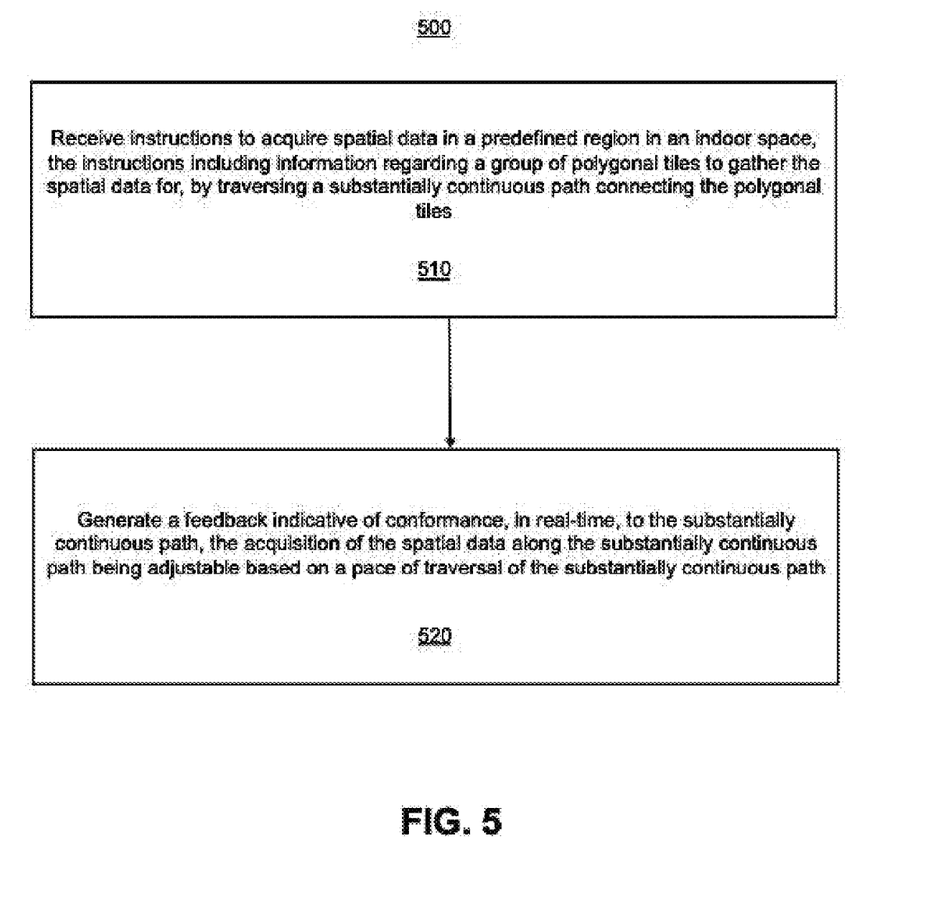
FIG. 5 illustrates, as an example, a method of performing targeted calibration of an indoor space.

FIG. 5 illustrates, as an example, a method of performing targeted calibration of an indoor space. In describing examples of FIG. 5, reference is made again to the examples of FIGS. 1-3 for purposes of illustrating suitable components or elements for performing a step or sub-step being described and for the sake of brevity, the detailed operation of the components or elements has not been repeated herein and will be understood to be associated with the respective step or sub-step being described.

It will be appreciated that some of the method steps may be deleted, modified, or more steps may be added. Also, the steps are not limited by the order in which they are performed. Some of the steps may be performed simultaneously as well.

Referring to FIG. 5 examples of method steps described herein are techniques are performed by the calibration device 102 executing one or more sequences of software logic instructions that constitute the data gatherer 106 and the feedback generator 335 of the calibration device 102. In embodiments, the data gatherer 106 and the feedback generator 335 may include the one or more sequences of instructions within sub-modules. Such instructions may be read into the memory 305 from machine-readable medium, such as memory storage mobile devices. Execution of the sequences of instructions contained in the data gatherer 106 and the feedback generator 335 in the memory 305 causes the processor 300 to perform the process steps described herein. It is contemplated that, in some implementations, some of the sub-modules, or any other portions of executable instructions constituting the data gatherer 106 and the feedback generator 335 may be hosted at a remote device. In alternative implementations, at least some hard-wired circuitry may be used in place of, or in combination with, the software logic instructions to implement examples described herein. Thus, the examples described herein are not limited to any particular combination of hardware circuitry and software instructions.

As an example, the method 500 is complementary to the method 400 in the manner that method 400 is executed on a server simultaneously as the method 500 is executed Accordingly, at block 510, instructions are received to acquire spatial data in a predefined region in an indoor space represented by the grid of polygonal tiles in a size-wise hierarchy and tessellated at each level of the size-wise hierarchy. The instructions can include information regarding an identified group of polygonal tiles in the predefined region for which the spatial data is to be gathered. For example, the identified group of tiles can be the ones identified at block 430 and are the ones selected at the same hierarchical level in the size-wise hierarchy as those selected at block 420.

Further, the spatial data is to be gathered for the polygonal tiles along a substantially continuous path connecting the group of polygonal tiles to be traversed for gathering the spatial data. For instance, based on the scores associated with the polygonal tiles in the preliminary discretized spatial map, the data gatherer 106 may identify the polygonal tiles which have the density of spatial data less than the threshold and, for identified polygonal tiles, the data gatherer 106 may determine the optimized route that connects the polygonal tiles which can be traversed to acquire the missing spatial data for the indoor space. In another example, the instructions received from the server 101 to acquire the spatial data include therein the substantially continuous path generated by the server 101 received at the calibration device 102.

At block 520, a feedback can be generated indicative of conformance, in real-time, to the substantially continuous path. The feedback may indicate whether the calibration device 102 is in conformance, in real-time, to the instructions from the server 101 to follow the substantially continuous path. For instance, the feedback generator 335 can monitor the real-time parameters associated with the calibration device, such speed, location, orientation, and other such inertial parameters, to determine whether the calibration device 102 conforms to the path in terms of the pace of traversal. For instance, the pace may be indicative of whether the calibration device 102 follows the path with an acceptable deviation of a threshold range or whether the calibration device 102 conforms with the speed with which the calibration device 102 must traverse the path to effectively gather the spatial data along the path.

Further, the acquisition of the spatial data along the substantially continuous path is adjustable based on a pace of traversal of the substantially continuous path. For instance, the pace may be indicative of whether the calibration device 102 follows the path with an acceptable deviation of a threshold range or whether the calibration device 102 conforms with the speed with which the calibration device 102 must traverse the path to effectively gather the spatial data along the path. In response to the feedback, the acquisition of the spatial data along the substantially continuous path may be adjusted based on a pace of traversal of the substantially continuous path. In an example, in response to the feedback or otherwise, the data gatherer 106 may obtain a user input regarding modification in a parameter associated with the substantially continuous path. In other examples, even after the generation of the feedback, if the calibration device 102 does not conform to the path, or the instructions, then the spatial data so acquired may not be used for calibration. However, such data may be tagged, labelled, ad stored, in an example, for later use.

Although the hierarchical structure, as envisaged by the present subject matter, has been described with the polygons higher in the hierarchy having a bigger size and smaller-sized polygonal tiles at lower levels of the hierarchy, any other manner of correlating the shapes and sizes of the polygonal tiles in the multiple layers may be implemented. For example, the hierarchy may be inverted and, instead, a larger polygonal tile may be lower in the hierarchy with respect to the smaller polygonal tiles.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method comprising:
   receiving instructions to acquire spatial data in a predefined region in an indoor space, the indoor space divided into a grid of a plurality of polygonal tiles in a size-wise hierarchy and tessellated at each level of the size-wise hierarchy, wherein the instructions comprise information regarding a group of polygonal tiles from amongst the plurality of polygonal tiles in the predefined region to gather the spatial data for, the group of polygonal tiles selected at a hierarchical level in the size-wise hierarchy, and wherein the spatial data is to be gathered for the group of polygonal tiles along a substantially continuous path connecting the group of polygonal tiles to be traversed for gathering the spatial data;
   commencing, in response to the instructions, acquisition of the spatial data along the substantially continuous path;
   generating a feedback indicative of conformance, in real-time, to the substantially continuous path; and
   adjusting the acquisition of the spatial data, based on the feedback.

2. The method of claim 1, wherein the substantially continuous path is determined based on an optimized route connecting the group of polygonal tiles.

3. The method of claim 2, wherein the optimized route is based at least on a shortest route connecting the group of polygonal tiles to be traversed for gathering the spatial data.

4. The method of claim 1, further comprising:
   obtaining a user input regarding modification in a parameter associated with the substantially continuous path, wherein a modified continuous path is generated based on the user input; and
   generating the feedback indicative of conformance, in real-time, to the modified continuous path.

5. The method of claim 4, wherein the parameter comprises a pace of traversal, the pace of traversal comprising at least one of a speed of traversal along the substantially continuous path and an orientation during traversal along the substantially continuous path.

6. The method of claim 1, wherein the substantially continuous path is to connect the group of polygonal tiles having a density of the spatial data less than a predetermined threshold.

7. The method of claim 1, wherein the generating comprises determining conformance to a pace of traversal, the conformance to the pace of traversal being indicative of an acceptable deviation from at least one of a speed of traversal along the substantially continuous path and an orientation during traversal along the substantially continuous path.

8. The method of claim 1, wherein the adjusting comprises conforming to at least one of the substantially continuous path and a pace of traversal of the substantially continuous path.

9. The method of claim 1, further comprising providing, on a graphical user interface, the substantially continuous path and the conformance to the substantially continuous path in real time.

10. A calibration device comprising:
   a processor; and
   a memory storing a set of instructions, the instructions executable in the processor to:
      receive instructions to acquire spatial data in a predefined region in an indoor space, the indoor space divided into a grid of a plurality of polygonal tiles in a size-wise hierarchy and tessellated at each level of the size-wise hierarchy, wherein the instructions comprise information regarding a group of polygonal tiles from amongst the plurality of polygonal tiles in the predefined region to gather the spatial data for, the group of polygonal tiles selected at a hierarchical level in the size-wise hierarchy, and wherein the spatial data is to be gathered for the group of polygonal tiles along a substantially continuous path connecting the group of polygonal tiles to be traversed for gathering the spatial data;

commence, in response to the instructions, acquisition of the spatial data along the substantially continuous path; and generate a feedback indicative of conformance, in real-time, to the substantially continuous path, wherein the acquisition of the spatial data along the substantially continuous path is adjustable by conforming to at least one the substantially continuous path in response to the feedback.

11. The calibration device of claim 10, wherein the substantially continuous path is determined based on an optimized route connecting the group of polygonal tiles.

12. The calibration device of claim 11, wherein the optimized route is based at least on a shortest route connecting the group of polygonal tiles to be traversed for gathering the spatial data.

13. The calibration device of claim 10, wherein the substantially continuous path is to connect the group of polygonal tiles having a density of the spatial data less than a predetermined threshold.

14. The calibration device of claim 10, further comprising instructions executable in the processor to generate the feedback based on conformance to the pace of traversal, the conformance to the pace of traversal being indicative of an acceptable deviation from at least one of a speed of traversal along the substantially continuous path and an orientation during traversal along the substantially continuous path.

15. The calibration device of claim 14, further comprising instructions executable in the processor to adjust the acquisition of the spatial data along the substantially continuous path, response to the feedback, by conforming to the pace of traversal.

16. The calibration device of claim 10, further comprising instructions executable in the processor to:

obtain a user input regarding modification in a parameter associated with the substantially continuous path, wherein a modified continuous path is generated based on the user input; and generate the feedback indicative of conformance, in real-time, to the modified continuous path.

17. The calibration device of claim 16, wherein the parameter comprises a pace of traversal, the pace of traversal comprising at least one of a speed of traversal along the substantially continuous path and an orientation during traversal along the substantially continuous path.

18. The calibration device of claim 10, further comprising a user interface (UI) to display the substantially continuous path and the conformance of the calibration device to the substantially continuous path in real time.

19. The calibration device of claim 18, further comprising instructions executable in the processor to:

monitor an instantaneous actual position of the calibration device along the substantially continuous path;

determine an expected position of the calibration device based on an indicator on the user interface; and generate the feedback upon a mismatch between the expected position with the instantaneous actual position beyond a predetermined threshold.

\* \* \* \* \*